W. A. DENEHIE.
THROTTLE VALVE.
APPLICATION FILED JULY 28, 1913.
1,106,633.
Patented Aug. 11, 1914.
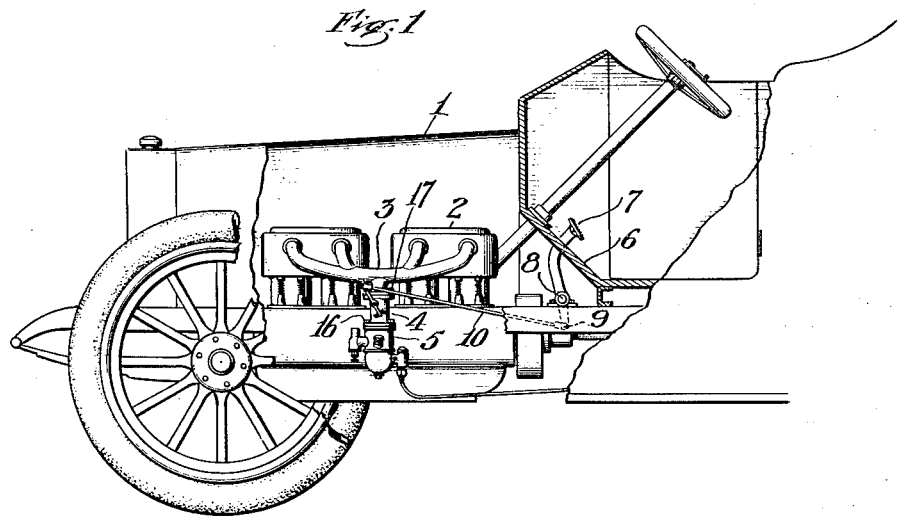
Fig. 1
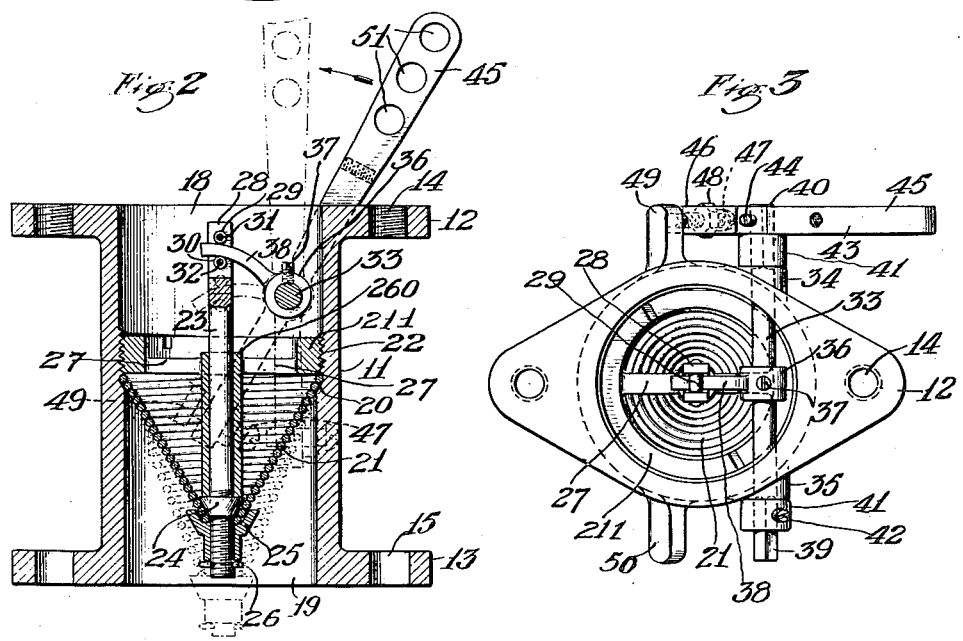
Fig. 2
Fig. 3
Witnesses:
Inventor,
William Austin Denehie;
Townsend & Graham
his attorneys.

UNITED STATES PATENT OFFICE.

WILLIAM AUSTIN DENEHIE, OF LOS ANGELES, CALIFORNIA, ASSIGNOR OF ONE-HALF TO GEORGE L. COOPER, OF LOS ANGELES, CALIFORNIA.

THROTTLE-VALVE.

1,106,633.  Specification of Letters Patent.  Patented Aug. 11, 1914.

Application filed July 28, 1913. Serial No. 781,671.

*To all whom it may concern:*

Be it known that I, WILLIAM AUSTIN DENEHIE, a citizen of the United States, residing at Los Angeles, in the county of Los Angeles and State of California, have invented a new and useful Throttle-Valve, of which the following is a specification.

My invention relates to valves and particularly to those adapted to be placed between an internal combustion engine and the carbureter therefor, such valves being commonly provided for the purpose of controlling the supply of explosive mixture admitted to the engine.

The principal object of my invention is to provide a valve which will tend to further divide and mix any gases or vapors passing therethrough and which may be actuated to pass a varying amount of such mixtures.

Another object of my invention is to provide a valve having the above characteristics which will be of simple construction and which may be self closing.

Further objects and advantages will appear more fully in the following specification.

Referring to the drawings, which are for illustrative purposes only: Figure 1 shows one embodiment of my invention applied to an automobile. Fig. 2 shows a vertical cross section through the center of this form of my invention. Fig. 3 shows a plan view of the same form of my invention.

My invention is particularly applicable to automobiles and is shown in the drawings as applied to an automobile. In these drawings 1 is a hood of an automobile in which is placed an engine 2, which is provided with a manifold 3 into which the explosive mixture is admitted before being distributed by the valves to the various cylinders. A valve 4 embodying my invention, as will hereinafter be explained, is placed in open communication with this manifold 3 on one end and with a carbureter 5 on the other end.

6 is a forward portion of the floor of an automobile through which a throttle pedal 7 extends, this pedal being pivoted on a shaft 8 and connected by means of a pin 9 with a throttle rod 10, this throttle rod being connected to the throttle valve which forms my invention, as will hereinafter be described. This throttle valve consists of a hollow cylinder 11, provided with flanges 12 and 13, these flanges having bolt holes 14 and 15 formed therein. The flanges and bolt holes being for the purpose of attaching the valve to the manifold 3 and the carbureter 5, as will plainly be shown in Fig. 1, the bolts 16 and 17 being used for this purpose. An opening 18 of the hollow cylinder 11 is in open communication with the manifold 3 and an opening 19 is in open communication with the carbureter 5. The hollow cylinder 11 is provided with a bore extending from the opening 18 to the opening 19, which bore has a shoulder 20 formed intermediate of its length. The larger end of a conical helical spring 21 is sprung against the shoulder 20, being secured firmly thereagainst by means of the nut 211 which is threaded into the interior of the hollow cylinder 11 by means of the thread 22. When the nut 211 is firmly screwed into place, the spring 21 is securely and tightly seated against the shoulder 20. The small end of the spring 21 is securely clamped to a rod 23 by means of a conical nut 24 and a cup shaped nut 25, these nuts being threaded upon the rod 23 and tightly clamped against the spring 21. A cotter pin 26 is passed through a hole in the rod 23 outside the nut 25 to prevent the same from working loose and releasing the spring. The rod 23 passes through a bearing 260 which is formed integral with the nut 211 being connected thereto by means of two arms 27. This rod extends upwardly through the bearing 260 and is provided with a slot 28 at its upper end in which is placed a pair of rollers 29 and 30, these rollers turning on pins 31 and 32 which pass through the rod 23.

A shaft 33 passes through bearings 34 and 35 formed on the body of the cylindrical member 11 and a lever 36 is secured by a set screw 37 to the shaft 33, this lever 36 being in a plane containing the axis of the cylindrical member 11. This lever 36 has an arm 38 which extends laterally from the shaft 33 and passes between the rollers 29 and 30, as shown in Fig. 2. Squared ends 39 and 40 are provided on each end of the shaft 33 and a collar 41 secured by a set screw 42 is supplied on the end 39 thereof. A lever 43 fastened by a set screw 44 is secured on the squared end 40 of the shaft 33. The relative positions of the collar 41 and the lever 43 may be readily changed to suit the different styles of automobile to which my device may be applied. The lever 43 is provided with an upper portion 45 and a lower portion 46, this lower portion 46 carrying a screw 47 secured by a nut 48, this screw being adapted to engage a lug 49 formed on the outside of the cylinder member 11. A second lug 50 is provided on the opposite side of the cylindrical member 11, so that the lever 43 and the collar 41 may be interchanged if it is desired to do so. The upper end 45 of the lever 43 is provided with a number of holes 51 to which the rod 10 may be attached, the attachment point of the rods being so selected that there is a convenient movement of the pedal 7.

The spring 21 is formed of stiff wire and is so wound that unless some external force is supplied to it, it will assume the position shown in Fig. 2 with the various coils thereof in close contact. In practice the set screw 47 is turned until it bears against the lug 49 and is secured by the nut 48 in this position. The attachment of this screw in an intimate contact with the lug 49 results in turning the shaft 33 in a counter-clockwise direction due to such screw 47 moving the lower end 46 of the lever 43. This counter-clockwise rotation of the shaft 33 forces the arm 38 downwardly, this arm pressing downwardly upon the roller 30 and forcing the rod 23 downwardly. This downward movement of the rod 23 tends to open the spring 21 and to leave a series of small openings between the coils thereof.

The method of operation of my invention is as follows: The set screw 47 is so adjusted that there is a small opening between the various coils 21, the total opening therethrough being such that a sufficient quantity of mixture passes in through the opening 19 and out through the opening 18 to keep the engine running at a slow speed without load. This is common practice on such throttle valves and prevents the engine from being suddenly stopped due to the pressure on the foot pedal 7 being relieved. When it is desired to admit more mixture to the engine 2, the pedal 7 is pushed downwardly pivoting about the shaft 8 and pulling upon the pin 9 which is attached to the rod 10. This rod being attached to the lever 43 rotates this lever in a clockwise direction, as shown in Fig. 1, or in a counter-clockwise direction, as shown in Fig. 2. This movement of the lever 43 rotates the shaft 33, forces the rod 23 downwardly and farther opens the coils of the spring 21. It will thus be seen that this spring forms a convenient type of valve which is self closing, the tension of the spring being sufficient to insure such closing. It has, however, further advantages. The opening between the coils of the spring 21 being of very great length, a comparatively small separation provides sufficient area for the passage of the mixture therethrough. This mixture enters the opening 19 in a line approximately parallel to the axis of the cylindrical member 11 and passes out through the opening 18 in approximately the same direction. It cannot, however, pass through the openings between the coils without changing its direction, it being necessary to make practically a right angle turn when the spring is very nearly closed. The mixture which is admitted through the opening 19 from the carbureter 5 is never even with the best forms of carbureters now obtainable a perfect mixture, but consists of larger or smaller particles of liquid more or less irregularly distributed in a body of air. As these particles of liquid strike upon and are blown off from the coils of the spring 21, they are further separated and mixed. The valve therefore has a very marked action as a further atomizer and mixer serving as an auxiliary carbureter in this respect. As the force and certainty of the explosions in a gasolene engine depend in a great measure on how perfect this mixture is, this characteristic of my invention is a valuable one and one that is not in any way common to the common forms of valves now in use.

It is understood that my invention herein disclosed is not limited to a valve for use upon a gasolene engine, but may be used for any fluid.

I claim as my invention:

In combination with a gasolene engine supplied with liquid fuel through a carbureter, a valve comprising a body member having an opening through which said liquid fuel may be passed, a helically wound conical spring normally closing said opening, and means for extending said spring so that the said liquid fuel may be drawn through the openings between the coils thereof and further mixed with air thereby.

In testimony whereof, I have hereunto set my hand at Los Angeles, California, this 17th day of July, 1913.

WILLIAM AUSTIN DENEHIE.

In presence of—
 FRANK L. A. GRAHAM,
 FRED A. MANSFIELD.